(12) United States Patent
Sharma

(10) Patent No.: US 6,798,404 B2
(45) Date of Patent: *Sep. 28, 2004

(54) INTEGRATED DIGITIZING TABLET AND DISPLAY APPARATUS AND METHOD OF OPERATION

(75) Inventor: Manish Sharma, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 241 days.

This patent is subject to a terminal disclaimer.

(21) Appl. No.: 10/038,466

(22) Filed: Jan. 2, 2002

(65) Prior Publication Data

US 2003/0122789 A1 Jul. 3, 2003

(51) Int. Cl.$^7$ ................................................. G09G 5/00
(52) U.S. Cl. ...................... 345/173; 345/179; 178/18.01
(58) Field of Search ................................. 345/156, 157, 345/158, 159, 160, 161, 162, 163, 164, 165, 166, 179, 176, 177, 419, 581–582, 587, 592, 606; 178/18.01, 18.03, 18.04, 18.05, 18.06, 18.07, 18.08, 18.09–20.04; 361/760, 785, 737, 797, 684, 685; 128/660.03, 696, 697, 702, 704, 708, 925

(56) References Cited

U.S. PATENT DOCUMENTS

| | | | | |
|---|---|---|---|---|
| 5,051,736 A | * | 9/1991 | Bennett et al. | ............. 345/180 |
| 5,243,317 A | * | 9/1993 | Chen et al. | .................... 338/92 |
| 5,554,828 A | | 9/1996 | Primm | |
| 5,576,502 A | | 11/1996 | Fukushima et al. | |
| 5,627,348 A | | 5/1997 | Berkson et al. | |
| 5,640,343 A | * | 6/1997 | Gallagher et al. | .......... 365/171 |
| 5,734,130 A | * | 3/1998 | Baker | ....................... 178/18.07 |
| 5,793,697 A | | 8/1998 | Scheuerlein | |
| 6,097,626 A | * | 8/2000 | Brug et al. | .................. 365/171 |
| 6,256,224 B1 | | 7/2001 | Perner et al. | |
| 6,385,111 B2 | * | 5/2002 | Tran et al. | ................... 365/210 |
| 6,404,647 B1 | * | 6/2002 | Minne' | ...................... 361/760 |
| 6,539,117 B2 | * | 3/2003 | Carau, Sr. | ................... 382/229 |
| 6,567,299 B2 | * | 5/2003 | Kunikiyo et al. | ........... 365/173 |
| 6,621,501 B2 | * | 9/2003 | Morrison | .................... 345/660 |
| 2003/0122788 A1 | * | 7/2003 | Sharma | ..................... 345/173 |
| 2003/0122790 A1 | * | 7/2003 | Sharma | ..................... 345/173 |

OTHER PUBLICATIONS

Magnetic Spin Locks Data Into MRAMS, R. Colin Johnson, EE Times, Jul. 17, 2001.
UPSTREAM: Computing's New Spin, David Talbot, Technology Review, Jan./Feb. 2001.
Computers to get a Good, Swift Boot, Leslie J. Nicholson, The Inquirer, Aug. 10, 2000.
Magnetic Materials in Electronic Applications, John M. Parsey, Jr., JOM, Jun. 2000.

* cited by examiner

*Primary Examiner*—Bipin Shalwala
*Assistant Examiner*—Mansour M. Said

(57) ABSTRACT

An integrated digitizing tablet and display apparatus is disclosed. The digitizing tablet portion of the apparatus is comprised of an array of magnetic random access memory (MRAM) cells, wherein each MRAM cell is responsive to an externally applied magnetic field. Each memory cell has a magnetic bit that changes orientation upon application of an externally applied magnetic field to produce an electrical signal based on the orientation of the bit when a second electric field is applied across the array. The display is comprised of an array of pixel cells and each pixel cell is coupled to one of the MRAM cells. The MRAM cell activates the pixel cell by the electrical signal produced by the MRAM cell. Thus, what is achieved is an integrated digitizing tablet and display that has digitizing cells that directly control the display cells without the need for additional processors.

24 Claims, 6 Drawing Sheets

INTEGRATED DIGITIZING TABLET AND DISPLAY APPARATUS AND METHOD OF OPERATION

Two further applications in magnetic random access memory array are described in co-pending U.S. patent application Ser. No. 10/038,485 (HP docket number 10019665-1), entitled "STYLUS BASED INPUT DEVICES UTILIZING A MAGNETIC RANDOM ACCESS MEMORY ARRAY", and co-pending U.S. application Ser. No. 10/037,028 (HP docket number 100200450-1), entitled "AN INTEGRATED DIGITIZING TABLET AND COLOR DISPLAY APPARATUS AND METHOD OF OPERATION", the disclosures of which are hereby incorporated herein by reference

BACKGROUND OF THE INVENTION

The present invention writes generally to digitizing input devices and, more particularly, the present invention relates to the utilization of a magnetic random access memory (MRAM) device as a digitizing array within a digitizer apparatus that is integrated with a display system.

Digitizer systems are well known to those skilled in the art. Typically, an electromagnetic array, or other type of system, is responsive to a stylus used by a user to enter data directly upon a grid and to control various computer functions by writing, sketching, or pointing the stylus against the digitizer array. Some embodiments locate the digitizer directly on the monitor; other embodiments separate the two devices. Usually, separate digitizers are utilized where a large work surface is needed compared to the size of the display device such as a monitor screen. Integrated digitizer and display devices are utilized where portability and size are important. As such, various types of computer systems utilize stylus-based technologies and may include portable systems, desktop systems, transportable, or terminal-based systems.

The integrated digitizer-display systems are integrated only in the sense that they are coplanar and are fitted together in a common device. They are not integrated in that a signal processor is required to convert the signals generated by the digitizer into display signals compatible with the display. Thus, additional circuitry and complexity are involved in even the simplest of digitizer-display systems that are integrated for direct input on the same display surface where the digitizer is located.

Several types of stylus input digitizing devices exist in the prior art. One type involves direct contact of a stylus tip against a capacitive-resistive array. As the stylus tip, such as a metal tip or even a user's finger, is placed proximate a selected area of a digitizing pad, a capacitive-resistive circuit within the pad detects the placement of the stylus and computes its location according to well-known mathematical formulas of a grid-based array. Typically, the capacitive-resistive array is used over small areas in devices such as a portable digitizer screen or finger-sensitive mouse pad.

A second prior art system utilizes an electromagnetic digitizer that interacts with a magnetic-tipped stylus or electromagnetic field-generating stylus in entering data and performing actions desired by the user. The tip of the stylus interacts with the field on the digitizer to convey information and data from the user. Typically a grid of intersecting lines produces a field that can be either actively or passively modified by the field generated by the stylus. Crossing lines can sense the field of the tip to generate a responsive signal, or can produce a field altered by the stylus during interaction.

Another embodiment is that of a stylus having an RF transmitter to send signals to the digitizing array, which then detects the transmitted signals utilizing receiving circuits in the array. Alternatively, the pad locations may be coated and the RF signal generated by the stylus interact with the array and are received at a receiver within the stylus itself.

Further, an alternative embodiment may incorporate a light source, such as visible or infrared light placed within the tip of the stylus to reflect off the pad. The stylus uses an imaging device, such as a CCD camera, to detect optically the return signal, and hence the location where the stylus interacts with the digitizer. The system then processes and decodes the received signal and location in order to determine the appropriate information.

Each of these systems has had some success; however, each has limitations that make them difficult or undesirable to use. For example, the direct contact technology is subject to scratches and wear during normal operation and has low durability compared to other technologies.

The wire-grid electromagnetic technology is expensive to implement and requires many individual wires for greater resolution. Additionally, the electromagnetic digitizers typically require a planar magnetic material behind the wire-grid sensor to shield the system from stray magnetic effects. In portable uses, this makes the technology for the system implementing such technology heavier than necessary. In the light-based systems, the stylus needs to be corded to the digitizer array and the need for sophisticated electronics for producing the light source as well as the CCD camera must be incorporated and expanded to achieve such a stylus.

One disadvantage common to all the various types of prior art digitizing technologies is that the digitizing array must always be under power in order for interaction of the user's stylus with the digitizer to be maintained. Further, the user must also save the information to long-term storage, such as the hard disk drive on the computing system, in order to preserve the content of the user's stylus session. Furthermore, in portable devices, the same can be said that the user's input must be stored in long-term memory and cannot be maintained on the digitizer, typically which is overlayed with the displayed system so that the user can keep the most recent information upon restart of the apparatus unless power is provided to preserve the information in memory.

Digitizing arrays have been mated with display systems in order to provide an easy method of drawing and viewing the results simultaneously. For example, a digitizing array may be overlayed with an indium tin oxide display panel such that if the user interfaces with the digitizer using the stylus, the images displayed immediately under the stylus as the user interacts therewith. This enables the user to interact with the screen as if interacting with real data or writing on an actual writing tablet using a pen. Such technologies always require the use of an input signal processor, which coordinates with the digitizer to receive the user's input via electromagnetic pulses, light pulses, resistive interaction or the used system to process the signals for display on the display apparatus portion.

Accordingly, what is needed is an improved digitizing apparatus that has greater resolution than the prior art systems, is easier to manufacture, and is more durable during actual use. Further, what is required is a digitizer apparatus that can be integrated with a display device and that can be manufactured with such a display as an electroluminescence apparatus using the same processing methods and techniques.

SUMMARY OF THE INVENTION

According to the present invention, an integrated digitizing tablet and display apparatus is disclosed. The digitizing tablet portion of the apparatus is comprised of an array of magnetic random access memory (MRAM) cells, wherein each MRAM cell is responsive to an externally applied magnetic field. Each memory cell has a magnetic bit that changes orientation upon application of an externally applied magnetic field to produce an electrical signal based on the orientation of the bit when a second electric field is applied across the array. The display is comprised of an array of pixel cells wherein each pixel cell is coupled to one of the MRAM cells and is activated by the electrical signal produced by the MRAM cell coupled thereto. Thus, what is achieved is an integrated digitizing tablet and display wherein the digitizing cells directly control the display cells without the need for additional processors. Further, the magnetic field may be either a fixed or varied field as generated by the interaction of a stylus that has either a fixed-field tip or a current-carrying tip to provide a varying field. Further still, the stylus may interact with the MRAM array to indicate an action to be performed by a computer system typically associated with the integrated digitizing tablet and display. The actions typically are those known in the art such as a right mouse click, a left mouse click, or other select functions and features. In one embodiment, the display portion is a thin film transistor display, but other transistor-based display systems may also be implemented.

The invention further includes a method of converting user input into image data within the integrated digitizing tablet and display of the present invention. Thus, the method includes providing an integrated array of MRAM cells and pixel cells, each MRAM cell having a magnetic bit that changes orientation upon application of a magnetic field and each cell being further coupled to one pixel cell, applying a magnetic field to the array to change the magnetic bit orientation of at least a portion of the MRAM cells, applying an input electric signal to the array, and activating the pixel cells coupled to the affected MRAM cells to display an image. The method may also include the application of a second magnetic field, independent of the first magnetic field, to change the magnetic bit orientation of at least a second portion of the MRAM cells to offer greater flexibility or to enable a second user to interact with the display digitizing assembly in concert with the first user. More than two magnetic fields may be applied and processed independently of one another.

An additional embodiment of the present invention includes an integrated digitizing and display cell. This integrated cell includes an MRAM cell actively coupled to a display pixel cell, wherein the functionality of the MRAM cell controls the functionality of the display cell directly without the need for further processing of the contents of the MRAM cell.

BRIEF DESCRIPTION OF THE DRAWINGS

Features and advantages of the present invention will become apparent to those skilled in the art from the following description with reference to the drawings, in which.

DETAILED DESCRIPTION OF SPECIFIC EMBODIMENTS

For simplicity and illustrative purposes, the principles of the present invention are described by referring mainly to exemplary embodiments thereof. However, one of ordinary skill in the art would readily recognize that the same principles are equally applicable to many types of digitizer systems with displays.

Figure 1:
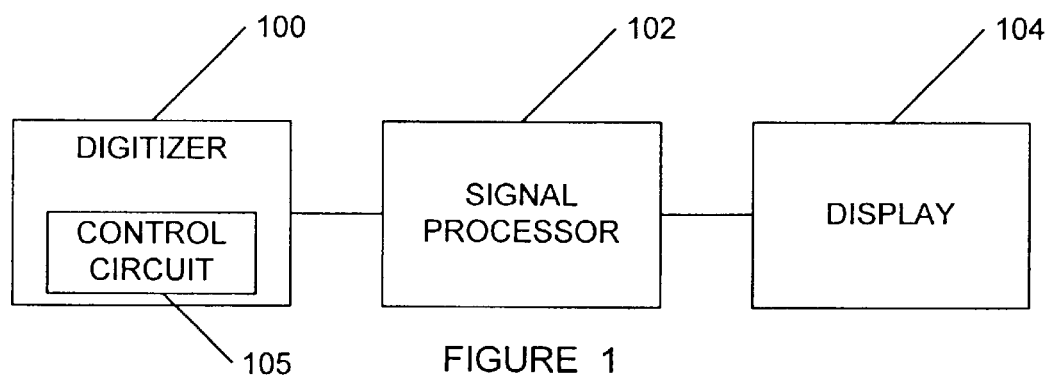
FIG. 1 illustrates a schematic diagram of a digitizing system with display unit in accordance with the present invention.

A digitizing apparatus that connects to a display system in accordance with the present invention is illustrated in FIG. 1. A digitizer 100 is disclosed that utilizes an array of magnetic random access memory (MRAM) cells to function as a stylus-based input device. Digitizer 100 couples to a signal processor 102, which further connects to a display system 104. Signal processor 102 receives signals from the digitizer 100 and processes them for display on video display 104. Digitizer 100 further includes control logic 105 that is utilized to control digitizer 100 during operations such as array read, array write, and array clear, which are well known to those skilled in the art.

Figure 2:
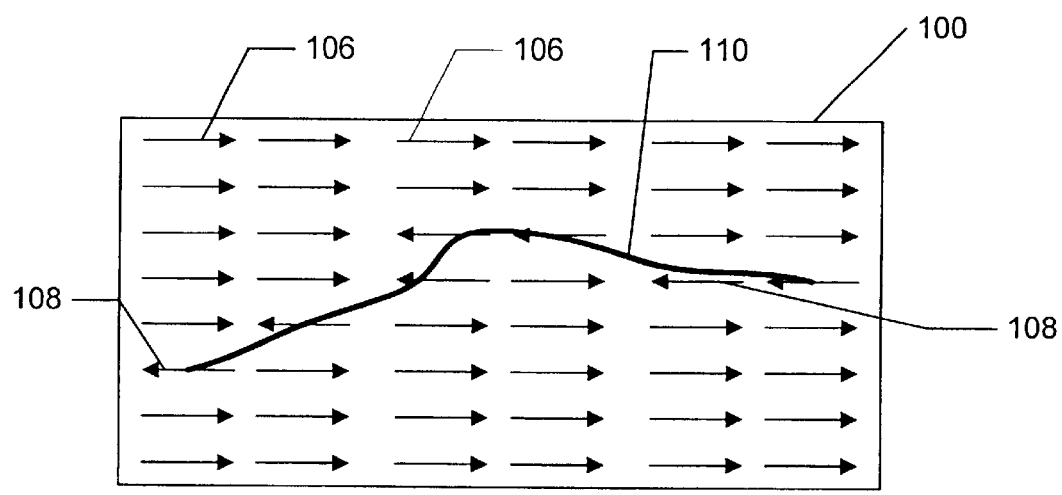
FIG. 2 illustrates a schematic diagram of a stylus interaction leaving a trace on a magnetic random access memory (MRAM) digitizing pad of that from FIG. 1.

Digitizer 100 is shown in further detail in FIG. 2, which illustrates a trace of a stylus tip over the surface of digitizer 100. The digitizer 100 is composed of an array of memory cells 106. Each memory cell has at least two state possibilities based on the orientation of a magnetic bit found within the cell 108. As a trace of a stylus interacting with the surface of digitizer 100 occurs, the bit within the cell is reoriented causing the state of memory cell(s) 106 to change as shown in cell 108. The trace 110 illustrates a path taken by the stylus. An electrical signal is then applied to the array of cells 106 as a read signal to generate a read output of those cells modified by the bit change. The read output signal, which is a modified electric signal caused by the changed bit positions, is then sent to the signal processor 102 of FIG. 1 where it is processed according to the pattern traced by the user. The trace 110 is then displayed on display unit 104.

MRAM cells have emerged as an alternative to long-term storage and the MRAM cells have similar properties of fast access of semiconductor memory. They can serve as long-term storage devices since they have the ability to store information indefinitely. An MRAM cell stores a bit of information based on the magnetic orientation of magnetization placed in a patterned thin-film magnetic element. This magnetic film is designed so that it has two stable and distinct magnetic states. The stable magnetic states define a binary one (1) or a binary zero (0). Although the digital information is stored in a thin magnetic film, many layers of very carefully controlled magnetic and dielectric layers are associated with a memory element.

Figure 3:
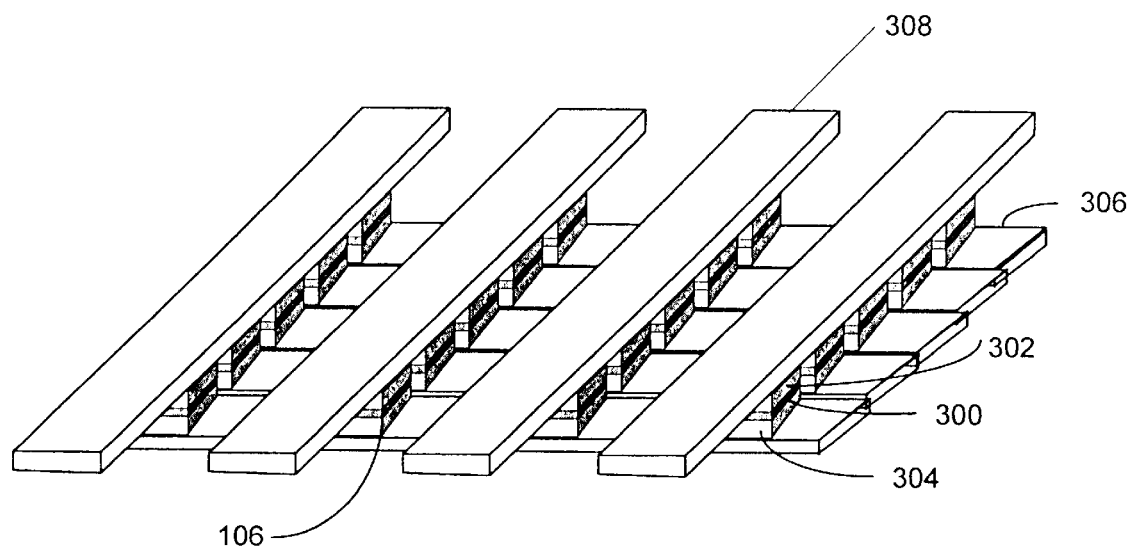
FIG. 3 depicts a schematic diagram of an array of MRAM cells as controlled by the sense and bit lines.

One example of an MRAM cell utilizes spin-tunneling effects and is known as a spin-tunneling device. FIG. 3 illustrates a schematic diagram of such an MRAM cell 106. MRAM cell 106 includes a tunneling barrier layer 300, a data storage or sense layer 302, and a reference film or pinned layer 304. The pinned layer 304 has a magnetic orientation that is fixed so as not to rotate in the presence of an applied magnetic field in the range of interest. The sense layer 302 has a magnetic orientation that is variable between a state aligned with the state of the pinned layer 304 and a state in misalignment with the state of the pinned layer 304. These orientations correspond to a low resistance state and a high resistance state, respectively. An insulating tunnel barrier layer 300 sandwiches between the magnetic pinned layer 304 and the magnetic sense layer 302. The insulating tunnel barrier layer 300 allows quantum mechanical tunneling to occur between the sense layer 302 and the pinned layer 304. The tunneling is electron-spin dependent, causing the resistance of the memory cell to vary as a function of the relative orientations of the magnetizations of the sense layer and the pinned layer.

The magnetic state of a selected memory cell 106 may be changed by applying currents to a word line 308 and a bit line 310 crossing the selected memory cell 106. The currents produce two orthogonal magnetic fields that, when combined, will switch the magnetic orientation of the selected memory cell 100 between the aligned and misaligned states, also known as the parallel and anti-parallel states, respectively. Other unselected memory cells receive only a magnetic field from either the word line or the bit line crossing the unselected memory cells. The single field is not strong enough to change the magnetic orientation of the unselected cells, so they retain their magnetic orientation. When a stylus having a magnetic tip is placed proximate the cells, a sufficient field is then applied to cause the magnetic state of the cell to change. This results in a change of orientation between the parallel and the anti-parallel states.

One advantage of utilizing MRAM cells other that of the prior art is that MRAM cells hold their orientation indefinitely without any external force applied to them. This means that no electric field or electric current must be applied to the MRAM cell in order to maintain the magnetization orientation of its magnetic bit. Thus, should the device be turned off, the orientation last impressed upon the cell will be maintained indefinitely. Once the system is reenergized, a readout operation would signal that the state has been maintained and thus an orientation is preserved. This allows a signal to be sent that would signify to the signal processor and therefore displayed on the display device the previous drawing made by the user on the digitizer array before the power was turned off.

The system utilizes a stylus with a magnetic tip in one embodiment that can be scanned over the digitizer array. Beneath the surface of the pad lies an array of MRAM cells very similar to the MRAM architecture previously described. As the stylus moves, a magnetic field is generated by the magnet within the tip of the stylus to cause bits to flip in the path of the stylus movement and leaves a trace as shown in FIG. 2. The MRAM array is continuously read and scanned for changes in the bit patterns recorded in it. As the stylus moves across the array, the trace changes the pattern and its path is displayed on the display.

Figure 4:
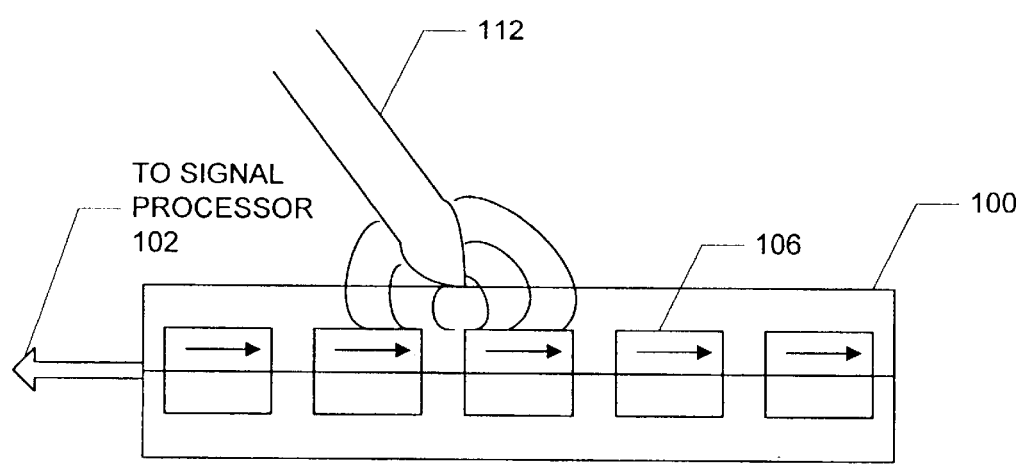
FIG. 4 depicts a cross-sectional side view of the stylus interacting with the digitizer tablet in accordance with the tablet of FIG. 2.

In one embodiment, the stylus tip shown in FIG. 4 comprises a permanent magnet that produces a known field. The magnet may be placed in the tip used to interact with the tablet or the stylus may be coated with a magnetic material that generates a magnetic field that can affect the MRAM memory cells. Supporting drive electronics are found within the digitizer and are well known to those skilled in the art. Initially, the drive electronics set all bits in the array of memory cells in a first direction. As the stylus tip moves across the array, the magnetic field induces a bit change in a direction opposite of their original alignment. The drive electronics periodically may reset all bits to their original orientation or when directed to by the user.

In an alternative embodiment, the tip of stylus 112 may produce a varying magnetic field using a current carrying coil. Since the current may be altered by changing its direction and its strength, the affected bits within the memory cells will be placed in a unique pattern as they have been changed both in space and in time in response to the current pattern selected by the user with the stylus. The current pattern may be varied by the user pressing the tip downward against the array, which may signify a button-press operation such as that on a mouse-type pointing device, or selecting one or more buttons on the stylus, which may signify different key clicks such as those in a mouse being a right, left, or middle button selection. In yet another embodiment, the varying current pattern may also signify changing colors, which will be described in greater detail below.

Additionally, since the MRAM cells operate independently of the other cells and the stylus, more than one stylus may also be utilized. Accordingly, a plurality of stylus may be utilized, each operating independently of the other as the cells they affect also operate independently of one another. Thus, the use of one stylus as illustrated is but exemplary of the invention and not limiting. For example, a multi-fingered input system may be implemented. The multi-fingered input device may be implemented within a glove array wherein each finger has a distinctly coded stylus to generate a select signal unique from the other signals. The multi-fingered input system would enable one user to produce multiple traces on the underlying MRAM sensor array in accordance with the present invention.

The magnetic cell array is sensitive to magnetic fields. The strength of the magnetic field produced by the stylus is selected to be sufficient enough to be detected by the array without direct contact. This allows a covering to be placed on the top surface of MRAM cells such that the pad may be written upon directly without fear of scratching or damaging the screen or array surface below.

Figure 5:
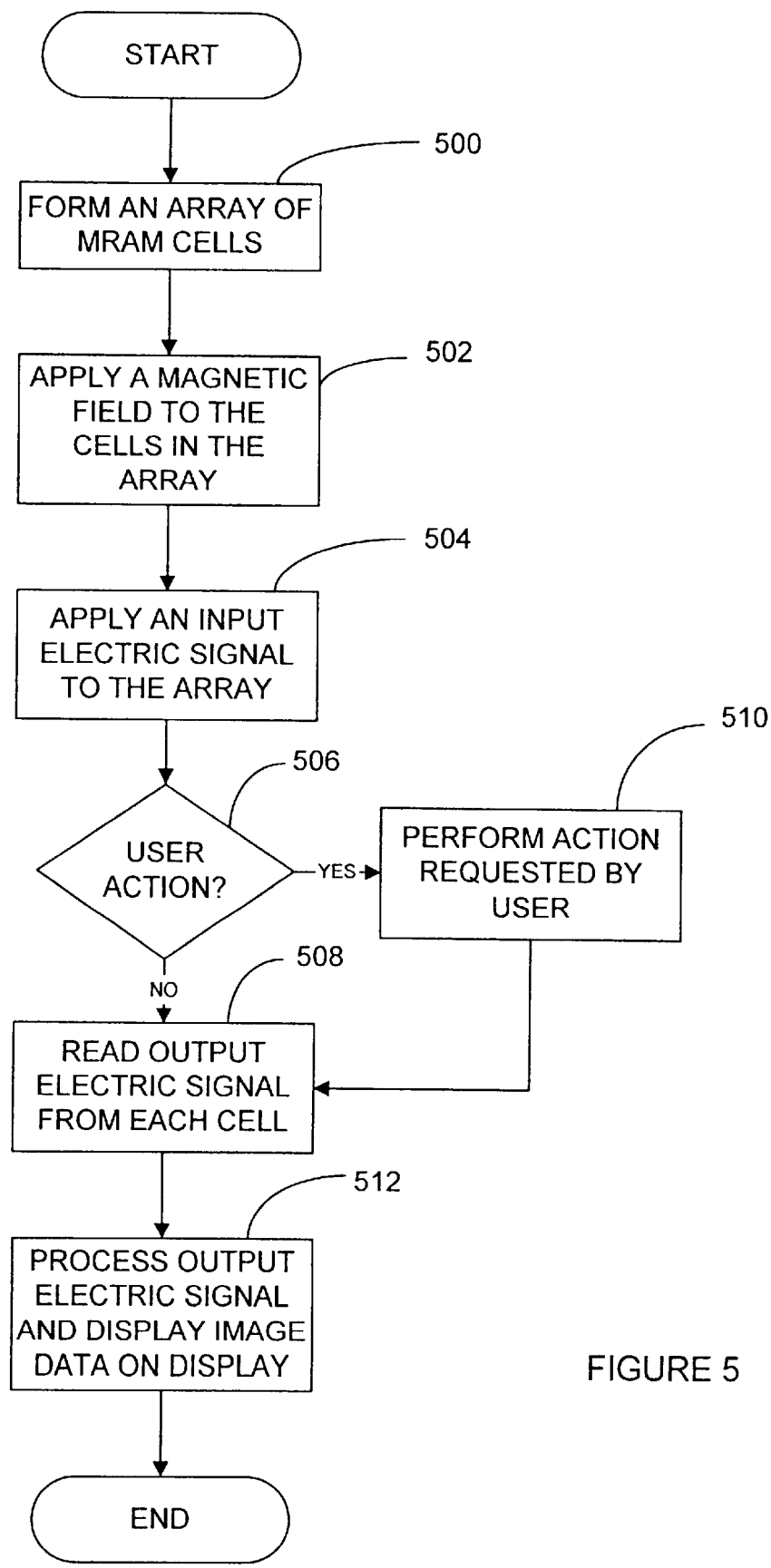
FIG. 5 is a diagram of the method steps utilizing inputting information for display within the MRAM digitizer system of the present invention.

FIG. 5 illustrates a flow diagram of a method that utilizes the array of MRAM cells as a digitizer device in accordance with the present invention. Initially, as shown in block 500, an array of such memory cells is formed. The memory cell includes additional control logic to identify particular locations on the digitizer panel where the stylus interacts. The detection of the stylus interaction of changing the bit orientation within selected cells enables a signal to be sent to a signal processing unit, which then causes the trace to be displayed on a display apparatus in accordance with the present invention. Once the MRAM cell array has been obtained, the user then applies a magnetic field to the cells within the array, as shown in block 502, via a stylus in order to generate a trace line on the display.

Next, the system applies a read electric signal to the array, shown in block 504, in order to determine which memory cells the user has altered via the stylus application. This electric signal, as modified by the affected cells, is forwarded to the signal processor where it is processed so as to identify those cells that have been modified. Once the cells are identified, pixels on the screen that correspond to the cell location on the digitizer are then activated to reproduce the trace on the display. During the interaction of the stylus with the digitizer panel, the system determines if the user has performed a particular action as shown in block 506. If the user is merely applying a magnetic field to the MRAM array, then the system as shown on block 508, reads the output signal from each signal. Otherwise, if the system detects that the user has performed a desired action, the system, as shown in block 510, performs the action requested by the user. Typically, these actions are similar to the action the user may take with a pointing device such as a mouse or roller ball. The actions can include a right or left mouse click or a center mouse click. The execution of a program or opening of a web page can also be conveniently located within an operating range of the stylus as implemented by the user.

Lastly, once the array has had its electric signal applied to it and the output signals have been read from each cell, the signal processor, as shown in block 512, processes the output electric signals and displays an image on the display corresponding to the image data discerned from the output electric signal. It should be noted that the output electric signal can provide output for more than one trace performed on the digitizer at any time as well as that different colors may be used for different traces or stylus actions as contemplated within the invention.

Figure 6:
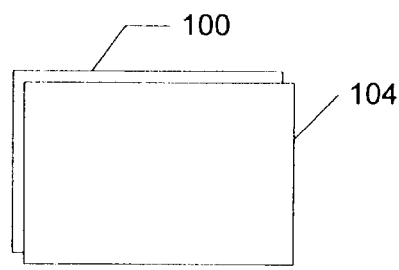
FIG. 6 illustrates a schematic diagram of a digitizer overlayed by a display apparatus in accordance with the present invention.

An alternative embodiment of the present invention is illustrated in FIG. 6. A display panel 104 physically mated with a digitizing MRAM array 100 is illustrated in the schematic diagram of FIG. 6. Display 104 is placed over digitizer 100 such that as the user traces the stylus across the surface of display 104, the magnetic field interacts with the array 100 below and causes a trace to be drawn exactly where the stylus interacts with the display panel. Signals are sent to the signal processor 102 and then sent to the display panel 104 for display. This has the advantage of integrating a digitizing apparatus 100 with a display apparatus 104 such as are utilized on laptop computers and personal digital assistances (PDA) devices and the like.

Figure 7:
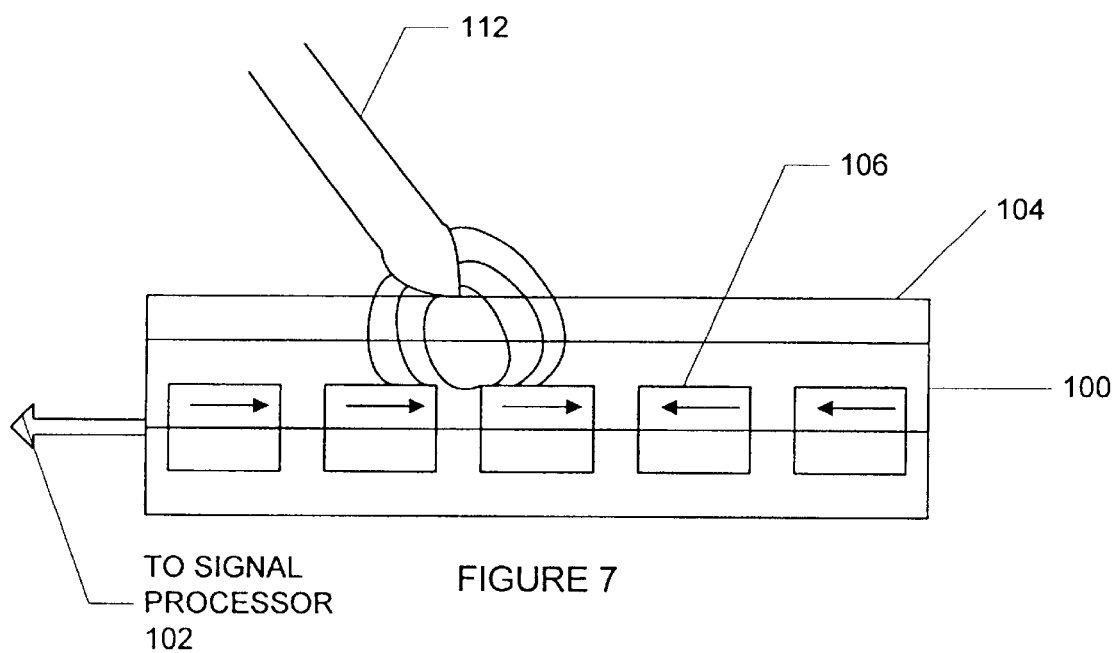
FIG. 7 depicts a cross-sectional side view of the operation of the MRAM digitizer tablet in accordance with the present invention along with a display placed on its surface.

Another embodiment of the invention, as illustrated in FIG. 7, mates a display apparatus 104 with a digitizer apparatus 100 such that the digitizer, utilizing the MRAM cells, actively controls the display pixels found within a display panel 104. The display panel used in this type of system typically utilizes transistors such as in an active matrix and is well known to those skilled in the art. The MRAM cells in the array are mated with a selected transistor to activate the pixel within the display in accordance with the present invention.

Figure 8:
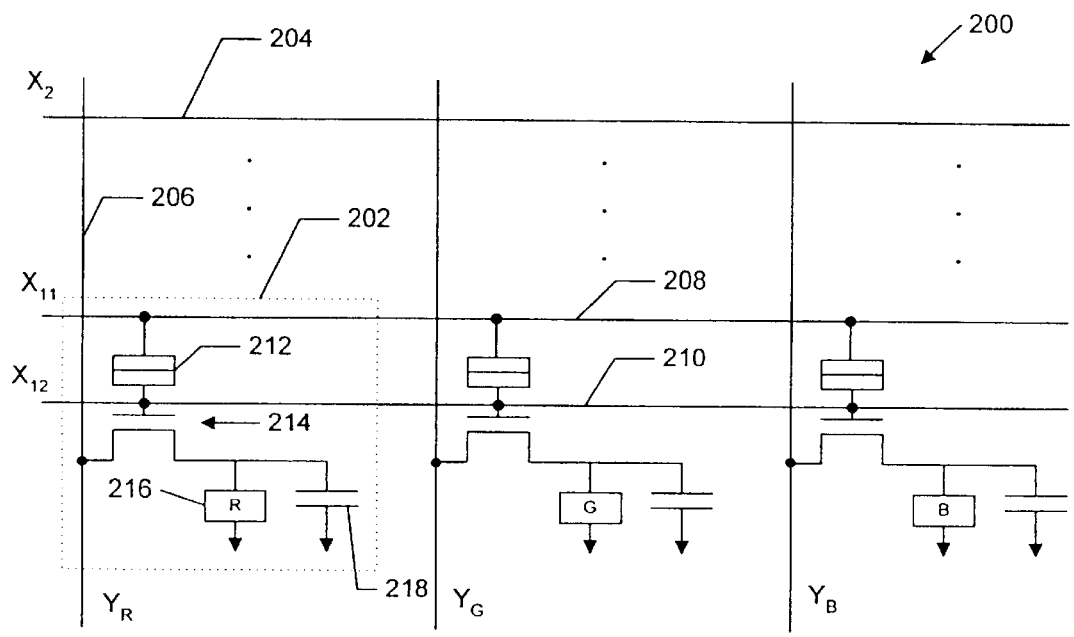
FIG. 8 illustrates a schematic diagram of the electrical circuit array utilized in accordance with the present invention where MRAM cells are provided.

FIG. 8 illustrates a schematic diagram of an array of pixels as controlled by a memory cell as integrated in a single digitizer-display system 200. Each pixel 202 is represented in the contents located within the dotted block and also contains a pixel enable line 206, a first row memory cell voltage line 208, and a second row memory cell voltage line 210.

Each display pixel 202 includes an MRAM cell 212, fixed between the two row memory cell voltage lines 208 and 210. Voltage cell line 210 is then further coupled to a switching device 214, such as a field effect transistor, which has its source coupled to the pixel enable line 206. Transistor 214 controls a pixel diode 216. In this illustration, pixel diode 216 generates a light of red color with a series of red, green, and blue pigments being provided in adjacent pixels to provide a color display and to depict an implementation of an MRAM array digitizer controlling a color apparatus and providing distinct color selection through the use the stylus. Each pixel 216 is coupled to a capacitor 218, to provide a constant power source to the pixel 216 when it is active.

The array 200 of FIG. 8 illustrates three pixels, selected from red, green, and blue (RGB). The array actually comprises a plurality of the pixels, with three colors being grouped together in individual cells comprising a single color pixel and a single MRAM. Thus, the array comprises a plurality of color pixels formed in an RGB matrix. Although there is illustrated an equal number pixels for each color, it should be noted that it is intended that the intensity level of each color be generally equal. As such, the designer will add additional pixels of one color over another in order to achieve equal color intensity. Or, the intensity of each color pixel can be controlled by another memory cell so that only one pixel per color is planned.

The array can comprise anywhere from just a few pixels in the X and Y directions to as large as is necessary to supply a display apparatus of conventional size. Such a display would have over a thousand lines in both the X and the Y dimensions.

Figure 9:
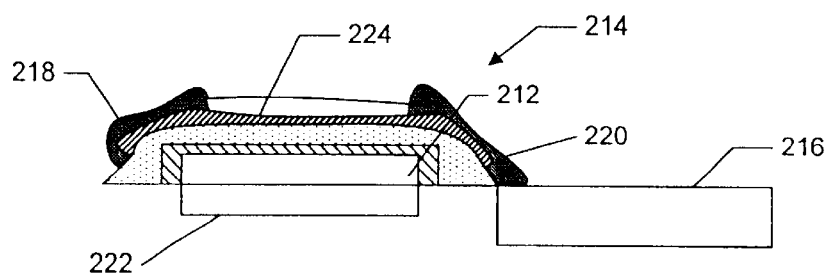
FIG. 9 illustrates a cross-sectional diagram of a MRAM cell fabricated with an electroluminescence pixel according to a schematic diagram of FIG. 7.

FIG. 9 illustrates a cross-sectional view of a cell 202 as implemented in a semiconductor material. The MRAM cell 212 is fabricated in the semiconductor material adjacent a light emitting pixel 216. The switch 214, which includes a source connection 218 and a drain connection 220, connects to pixel 216 for activation. A gate 222 is formed below the MRAM cell 216. The cell also includes proper isolation and conductive layers necessary for patterning and manufacturing an MRAM cell as well as a display pixel.

FIG. 9 further illustrates that the control cell portion is placed adjacent the display cell 216. The magnetic switching cells are typically much smaller than the display pixels. As such, the MRAM cells can be fabricated adjacent the display pixels since the display pixels are generally at least one order of magnitude larger than the MRAM cells. For example, the MRAM cells have a form factor ranging from 0.2 to 2.0 microns while the display pixels have a form factor of at 4 or 5 microns or larger. As such, additional control switches may be utilized because of their size and can serve as brightness control, among other needs.

Figure 10:
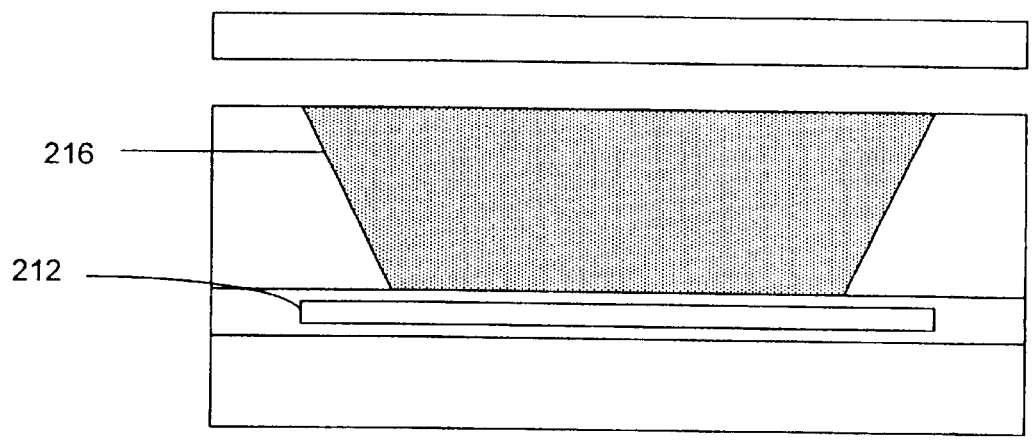
FIG. 10 illustrates an alternative embodiment of the MRAM cell interacting with an electroluminescence pixel where the MRAM cell is located beneath the pixel.

Placing the memory cell adjacent the pixel uses more semiconductor surface area than placing the memory cell below the pixel. Thus, an alternative embodiment of locating the memory cell 212 below the pixel display cell 216 is shown in FIG. 10. This enables greater resolution and greater density to be achieved in the same surface area as that of the pixel array shown in FIG. 9. The memory cells are displaced but a small distance behind or below the pixels. The distance is slight enough that the stylus can still interact with the memory cells when moved across the top surface of the digitizing display. This increased pixel density is not possible using other technologies that place the switch within the same substrate as the pixel. This displacement also makes the magnetic cells less susceptible to outside magnetic fields, which will typically attenuate before affecting the orientation of the bit within a given memory cell.

Figure 11:
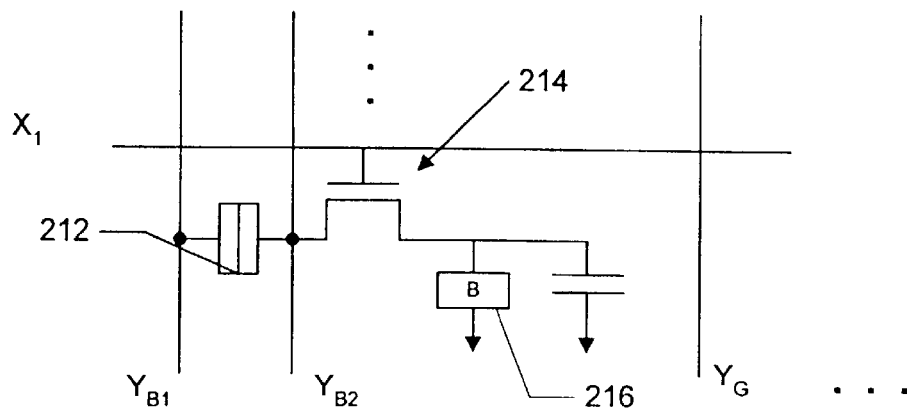
FIG. 11 illustrates a schematic diagram of an alternative embodiment of utilizing an MRAM for activating a pixel in accordance with the present invention.

FIG. 11 illustrates yet an alternative embodiment of a directly activated display pixel 216, as contemplated in the present invention wherein memory cell 212 controls the source of the switching transmitter 214 as opposed to being connected directly to the gate as was illustrated in FIG. 8. The array includes a first column memory voltage control line 232 and a second column memory voltage line 234, which connect in parallel with memory cell 212. A pixel row control line 236 couples to the gate of transistor 214. When a signal is applied to voltage line 232, a current flows through memory cell 212 depending upon the orientation of the bit therein. If the orientation allows for current flow through the cell, then switch 214, activated by control line 236, causes pixel 216 to activate and display. Additional cells are provided to form an array of cells as contemplated in the present invention.

Figure 12:
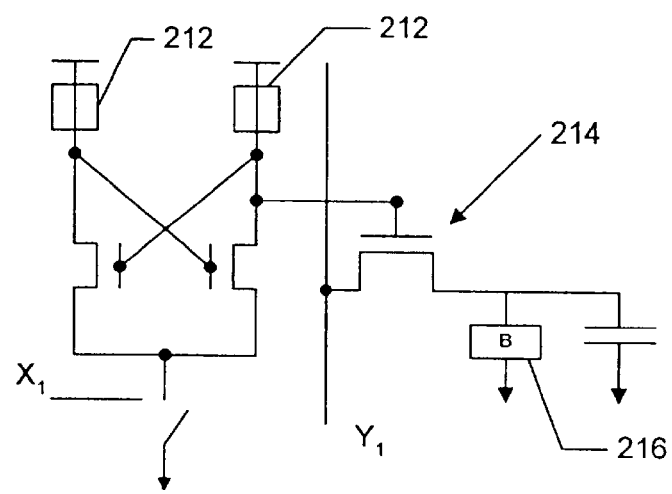
FIG. 12 illustrates a schematic diagram of an alternative embodiment of a memory cell implemented to activate a pixel in accordance with the present invention.

FIG. 12 illustrates yet another alternative embodiment that utilizes a memory cell 212 in an improved circuit for controlling the activation of a display pixel 216. A pair of memory cells 212 controls the activation of switching transistor 214. The pair of memory cells 212 is placed within a differential sense amplifier circuit to determine the signal strength of either an activated or non-activated memory cell using conventional means. A first cell 212 receives a first signal and the second cell receives a second signal complementary to the first signal. The use of complementary cells is exemplary only and is utilized as it improves the signal-to-noise ratio of the sensing electronics. Alternatively, a single cell can be utilized that is not dependent on a complementary cell for improved noise reduction or accuracy.

Further, the cell size is scalable depending upon the accuracy desired as well as the display device integrated within the digitizing system. For example, current processing techniques yield cell sizes ranging from 0.1 micron to 0.3 micron in memory array applications. For applications in display and digitizer systems, cell sizes comparable with the display pixel and switching circuit sizes is acceptable, which provides sizes in the micron to the tens of microns size. This scalability provides yet another advantage over that of the prior art.

Thus, it has been demonstrated that a digitizing device utilizing an array of MRAM cells may be incorporated to interact with a display device and that the digitizer device may actually be combined with the display using thin-film transistor cells so the memory cells directly activate the pixels within an active matrix display. The result is a digitizer-display that needs little, if any, signal processing logic as is required in other digitizer-display units. Thus, as the user writes a trace directly on the display, the trace is displayed directly on the screen with little, if any, intermediary processing.

Further, since the MRAM cells array serves as an addressable memory array, this simplifies the drive electronics typically required in prior art systems. Additionally, the displayed image/graphics or otherwise defined information can be stored in a non-volatile fashion due to the nature of the MRAM cells as previously described. Since the MRAM cells retain the last selected orientation of the memory bits indefinitely, when the display system is turned off and then turned on again, no loss of information occurs. The display acts as a writable and reusable paper medium rather than as a conventional digitizer tablet that always required saving of data to a long-term memory store rather than directly within the digitizer itself.

Although thin-film transistor (TFT) cells have been depicted in the specific embodiments of the present invention, alternative display cells may also be utilized. In addition, the MRAM cell disclosed has utilized tunneling magneto-resistive (TMR) effect, but other MRAM cells may also be contemplated. These will include cells based on magneto-resistive (MR) effect, giant magneto-resistive (GMR) effect, magnetic tunneling junction (MTJ) effect, or colossal magneto-resistive (CMR) effect.

There are four very different physical effects that produce MR of different types: AMR (anisotropic), GMR (giant), TMR (tunneling) and CMR (colossal). Tunneling Magneto-resistance (TMR) or the tunneling magneto-resistive effect (TMR effect) is the change in resistance generated by the physical effect of spin-dependent tunneling (SDT) that is seen in a magnetic tunnel junction (MTJ, also sometimes called an SDT junction).

For illustration, an MTJ-based cell behaves as a resistance with two states, having a high resistance state and a low resistance state. The memory cell is connected to the gate of the transistor switch 216 and the memory cell resistance is chosen such that the drive voltage will turn on or off the pixel or the switch 214 depending upon the state of the memory cell 212. Once the switch 214 turns on (or off) it causes the neumatic liquid crystal display to block (or pass) light through it. The state of the cell 212 is changed externally by the presence of the stylus in the magnetic field located within the tip of the stylus. This further causes the switch 214 to turn off or on and consequently the pixel turns off or on.

Additionally, switching and conveying electronics is also incorporated into the design such that the entire memory cell array may be refreshed or erased or individual cells may be turned on or off or refreshed. Further, the electronics allows for the information in the cells to be stored in the long-term memory device should the contents in the array need to be saved but also erased so that additional writings may be performed.

The application of color to the memory cell array can be obtained by creating memory cells of differing levels of sensitivity. This means that the cells for red may be sensitive to a neumatic field of a particular field strength separate from that of the blue or green pixels and vice versa. This allows the user the option of modifying colors on the fly by actively selecting the level of field strength desired that would activate one, two or all three pixels at any time to achieve the desired colored results.

It is to be understood that the above-described arrangements are only illustrative of the application for the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. An integrated digitizing tablet and display comprising:
a digitizing tablet comprised of an array of magnetic random access memory (MRAM) cells, each MRAM cell is responsive to an externally-applied magnetic field, said magnetic field being applied with at least one pointing device having a magnetic tip, each memory cell having a magnetic bit that changes orientation upon application of the externally-applied magnetic field to produce an electrical signal based on the orientation of the bit when a second electric field is applied across the array; and a display comprised of an array of pixels, each pixel being coupled to one of the MRAM cells and activated by the electrical signal produced by the MRAM cell coupled thereto.

2. The digitizing tablet as claimed in claim 1 wherein each MRAM cell has a form factor of less than one micron.

3. The invention as claimed in claim 1 wherein the magnetic field is a fixed field.

4. The invention as claimed in claim 1 wherein the magnetic field can vary during interaction with a MRAM cell.

5. The invention as claimed in claim 1 further comprising a stylus that has a first tip that generates the externally applied magnetic field.

6. The invention as claimed in claim 5 wherein the stylus can interact with the MRAM array to indicate an action to be performed.

7. The invention as claimed in claim 5 wherein the stylus included current-carrying coil to interact with the MRAM array.

8. The invention as claimed in claim 1 wherein a second externally-applied magnetic field can interact with the MRAM array simultaneously with at least one externally-applied magnetic field.

9. The invention as claimed in claim 1 wherein the array of pixels comprise TFT display cells and are placed above the array of MRAM cells.

10. A method of converting user input into image data, comprising:

providing a digitizing tablet having an integrated array of magnetic random access memory cells and pixels, each MRAM cell having a magnetic bit that changes orientation upon application of a magnetic field and each cell being further coupled to one pixel;

applying a magnetic field external to the MRAM cell to the array to change the magnetic bit orientation of at least a portion of the MRAM cells, wherein the magnetic field is applied with at least one pointing device having a magnetic tip;

applying an input electric signal to the array; and activating the pixels coupled to the affected MRAM cells to display an image.

11. A method of converting user input into image data according to claim 10 wherein the pixels form an array consistent with the array of MRAM cells and wherein the pixels serve as a video display directly controlled by the array of MRAM cells.

12. A method of converting user input into image data according of claim 11 further comprising mating a display device to the MRAM array wherein the displayed image corresponds to the location proximate where the magnetic field is applied to the MRAM array.

13. A method of converting user input into image data according of claim 11 further comprising, in the event of an electrical power stoppage to a display device and the MRAM array, redisplaying the image based on the magnetic bit orientation of the MRAM cells within the MRAM array upon return of electrical power.

14. A method of converting user input into image data according to claim 10 also comprising applying a second magnetic field, independent of the first magnetic field, to change the magnetic bit orientation of at least a second portion of the MRAM cells.

15. A method of converting user input into image data according to claim 10 wherein the magnetic field applying step further comprises selectively varying the magnetic field during application to affect the magnetic bit orientation of the at least a portion of MRAM cells.

16. A method of converting user input into image data according to claim 10 also comprising:

sensing an action performed by a user; and performing a function associated with the sensed action.

17. A method of converting user input into image data according to claim 10 wherein the magnetic bit orientation for each cell is maintained without refresh.

18. An integrated digitizing and display cell comprising:

a magnetic random access memory (MRAM) cell that is responsive to an externally-applied magnetic field and having a magnetic bit that changes orientation upon application of an electric field or the externally-applied magnetic field to produce an electrical signal based on the orientation of the bit when a read signal is applied across the cell, wherein the magnetic field is applied with at least one pointing device having a magnetic tip; and a display pixel coupled to the MRAM cells and activated by the electrical sign.

19. The invention as claimed in claim 18 wherein the digitizing and display cell has a form factor of less than one micron.

20. The invention as claimed in claim 18 wherein the magnetic field is a fixed field.

21. The invention as claimed in claim 18 wherein the magnetic field can vary during interaction with a MRAM cell.

22. The invention as claimed in claim 18 further comprising a stylus that has a first tip that generates the externally-applied magnetic field.

23. The invention as claimed in claim 22 wherein the stylus can interact with the MRAM cell to indicate an action to be performed.

24. The invention as claimed in claim 18 wherein the pixel is a TFT display pixel.

* * * * *